United States Patent
Mikiya et al.

(10) Patent No.: US 6,886,803 B2
(45) Date of Patent: May 3, 2005

(54) FEMALE AND MALE COUPLERS OF PIPE COUPLING

(75) Inventors: Toshio Mikiya, Tokyo (JP); Jin Yamashita, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 0 days.

(21) Appl. No.: 10/857,412

(22) Filed: May 28, 2004

(65) Prior Publication Data

US 2004/0238048 A1 Dec. 2, 2004

(30) Foreign Application Priority Data

May 30, 2003 (JP) ........................................ 2003-155367

(51) Int. Cl.$^7$ .............................................. F16L 37/28
(52) U.S. Cl. .............................. 251/149.1; 137/614.03; 137/614.04; 251/149.6
(58) Field of Search ....................... 137/614.04, 614.03, 137/614.05, 614; 251/149.1, 149.6

(56) References Cited

U.S. PATENT DOCUMENTS

| | | | | |
|---|---|---|---|---|
| 2,666,656 A | * | 1/1954 | Bruning | 137/614.04 |
| 2,966,371 A | * | 12/1960 | Bruning | 137/614.04 |
| 3,498,324 A | * | 3/1970 | Breuning | 137/614.04 |
| 3,525,361 A | * | 8/1970 | Cerbin et al. | 137/614.04 |
| 6,158,717 A | * | 12/2000 | Van Scyoc et al. | 251/149.6 |
| 6,354,564 B1 | * | 3/2002 | Van Scyoc et al. | 251/149 |

FOREIGN PATENT DOCUMENTS

| | | |
|---|---|---|
| JP | S50-039862 | 11/1975 |
| JP | S54-099116 | 7/1979 |
| JP | S55-120885 | 8/1980 |
| JP | S57-040399 | 9/1982 |
| JP | H04-073488 | 3/1992 |

* cited by examiner

*Primary Examiner*—Kevin Lee
(74) *Attorney, Agent, or Firm*—Brinks Hofer Gilson & Lione

(57) ABSTRACT

A female coupler and a male coupler of a pipe coupling that are easy to assemble and have a minimized passage resistance are provided. The female coupler includes a cylindrical female coupler body adapted to receive the male coupler from a front end opening thereof. A pipe connection adapter has a cylindrical connecting portion that is inserted into the female coupler body from a rear end opening thereof, and is thus connected to the female coupler body. The pipe connection adapter has two support legs extending from the front end surface of the cylindrical connecting portion. A valve support ring is secured to the distal ends of the support legs. The valve support ring has an outer circumferential surface that has a diameter smaller than the outer diameter of the cylindrical connecting portion, whereby a fluid passage is defined between the outer circumferential surface of the support ring and the wall surface of the through-hole of the female coupler body. The support legs are connected to the valve support ring at the rear end surface thereof. The male coupler has an arrangement similar to the above.

16 Claims, 5 Drawing Sheets

FEMALE AND MALE COUPLERS OF PIPE COUPLING

This application claims priority under 35 U.S.C. §119 to Japanese Patent Application No. 2003-155367 filed May 30, 2003, the entire content of which is hereby incorporated by reference.

BACKGROUND OF THE INVENTION

1. Field of the Invention

The present invention relates to a pipe coupling including a female coupler and a male coupler that are connected to one another.

2. Description of the Related Art

A female coupler and a male coupler, which together constitute a pipe coupling, may be provided in their respective fluid passages with a valve to enable opening or closing of the passages. These valves are supported in the respective passages by using valve support members. The valve support members are prepared separately from the female coupler body and the male coupler body and, during assembly, they are fitted into the female coupler body and the male coupler body, respectively (for example, see Japanese Utility Model Application Post-Examination Publication Nos. Sho 50-39862, Sho 55-120885 and Sho 54-99116).

In conventional female and male couplers, however, preparation and fitting of valve support members requires complicated operations to be carried out. Moreover, it is necessary to configure the valve support members such that they can be securely fitted into respective fluid passages in the female coupler and the male coupler. Therefore, a problem arises in the conventional female and male couplers that a cross-sectional area of their respective fluid passages is caused to become narrow, resulting in an increase in resistance therein.

In view of the problem described above, a female coupler and a male coupler have been disclosed in which valve support members are integrally formed on passage wall surfaces that define fluid passages in the female coupler and the male coupler (for example, see Japanese Patent Application Unexamined Publication (KPKAI) No. Hei 4-73488).

However, production of this type of male and female coupler is complicated and is therefore impractical.

There has also been disclosed a female coupler and male coupler in which a female coupler, for example, includes a cylindrical female coupler body having a front end opening for connection with a male coupler, wherein a cylindrical pipe connection adapter is coaxially inserted into the female coupler body from a rear end opening thereof and connected to the female coupler body. The front end of the pipe connection adapter is closed, and a hole is provided in the center of the closed end. A valve guide rod extending rearward from a valve element positioned forward of the closed end is passed through the center hole to support the valve element. In addition, the side wall of the pipe connection adapter is provided with an opening for passing a fluid (for example, see Japanese Utility Model Application Post-Examination Publication No. Sho 57-40399).

Since it is not necessary to separately provide the above-described female coupler with a valve support member, assembly of the coupler is facilitated. However, because a fluid must be able to pass through a passage around the front end of the cylindrical pipe connection adapter, the cross-sectional area of the through-hole in the female coupler body that receives the adapter has to be increased at a portion around the front end of the adaptor. It is also necessary to provide at the distal end of the through-hole a valve seat having a small diameter, which makes it difficult to form the hole in the female coupler body.

SUMMARY OF THE INVENTION

The present invention has been made to solve the above-described problems of conventional pipe couplings. That is, the present invention provides a female coupler for connection to a male coupler to form a pipe coupling. The female coupler includes a cylindrical female coupler body having a front end opening, a rear end opening, and a through-hole extending between the front end opening and the rear end opening. The female coupler body is adapted to receive the male coupler from the front end opening for connection of the male coupler thereto. A pipe connection adapter is provided which has a cylindrical connecting portion that is inserted into the female coupler body from the rear end opening, and is thus connected to the female coupler body. A valve element is set in the through-hole of the female coupler body at a position forward of the cylindrical connecting portion to enable the through-hole to be either opened or closed. The pipe connection adapter has a plurality of support legs, each extending from the front end surface of the cylindrical connecting portion axially forward of the cylindrical connecting portion. A valve support ring is secured to the distal ends of the support legs. The valve support ring has a front end surface, a rear end surface, an outer circumferential surface, and an inner circumferential surface. The front end surface faces a valve head of the valve element set at a position axially forward of the valve support ring. The rear end surface faces axially rearward of the valve support ring. The outer circumferential surface has a diameter smaller than the outer diameter of the cylindrical connecting portion, whereby a fluid passage is defined between the outer circumferential surface of the valve support ring and the wall surface of the through-hole of the female coupler body. The inner circumferential surface slidably receives a valve guide rod extending from the valve head axially rearward of the female coupler body. The support legs are connected to the valve support ring at the rear end surface thereof.

In addition, the present invention provides a male coupler of a pipe coupling. The male coupler includes a cylindrical male coupler body having a front end opening, a rear end opening, and a through-hole extending between the front end opening and the rear end opening. The male coupler body is inserted into the female coupler from a front end portion thereof to connect with the female coupler. A pipe connection adapter has a cylindrical connecting portion that is inserted into the male coupler body from the rear end opening, and is thus connected to the male coupler body. A valve element is set in the through-hole of the male coupler body at a position forward of the cylindrical connecting portion to open or close the through-hole. The pipe connection adapter has a plurality of support legs extending from the front end surface of the cylindrical connecting portion axially forward of the cylindrical connecting portion. A valve support ring is secured to the distal ends of the support legs. The valve support ring has a front end surface, a rear end surface, an outer circumferential surface, and an inner circumferential surface. The front end surface faces a valve head of the valve element set at a position axially forward of the valve support ring. The rear end surface faces axially rearward of the valve support ring. The outer circumferential surface has a diameter smaller than the outer diameter of the cylindrical connecting portion whereby a fluid passage is formed between the outer circumferential surface of the valve ring and the wall surface of the through-hole of the male coupler body. The inner circumferential surface slidably receives a valve guide rod extending from the valve head axially rearward of the male coupler body. The support legs are connected to the valve support ring at the rear end surface thereof.

Thus, in each of the female coupler and the male coupler of the pipe coupling according to the present invention, a valve support ring is provided that has an outer diameter which is smaller than that of the cylindrical connecting portion, thereby ensuring that sufficient space exists between the valve support ring and the fluid passage wall surface of the female coupler body or the male coupler body. In addition, the support legs are connected to the valve support ring at the rear end surface thereof. Therefore, the support legs do not obstruct the space. Accordingly, relative to the conventional arrangement, passage resistance can be greatly reduced.

More specifically, each support leg may have an axial portion extending from the distal end surface of the cylindrical connecting portion in parallel to the center axis of the cylindrical connecting portion, and a radial portion extending from the distal end of the axial portion radially inward either at right angles or obliquely forward as far as the rear end surface of the valve support ring, and secured to the rear end surface.

It is preferable from the viewpoint of appropriately supporting the valve support ring that two support legs are provided to extend from respective positions on the front end surface of the cylindrical connecting portion in symmetrical relation to the center axis of the cylindrical connecting portion, to be secured to the rear end surface of the valve support ring at respective positions in symmetrical relation to the center axis of the cylindrical connecting portion.

Further, the above-described female coupler is preferably arranged as follows. The female coupler body has an adapter receiving portion that extends from the rear end opening of the female coupler body towards the front end thereof to receive the cylindrical connecting portion of the pipe connection adapter and the valve head positioned forward of the front end of the cylindrical connecting portion. The adapter receiving portion has a substantially uniform inner diameter over its entire length. An annular valve seat is formed at the front end of the adapter receiving portion. The valve seat is adapted to be engageable with the valve head. The female coupler body further has a male coupler receiving portion that communicates with the adapter receiving portion through the valve seat and extends as far as the front end of the female coupler. The cylindrical connecting portion of the pipe connection adapter has an outer diameter substantially equal to the inner diameter of the adapter receiving portion. The support legs extend from the front end surface of the cylindrical connecting portion so as to contact with the inner peripheral surface of the adapter receiving portion.

Similarly, the above-described male coupler is preferably arranged as follows. The through-hole of the male coupler body extends from the rear end opening of the male coupler body towards the front end thereof. An annular valve seat is formed at the front end of the through-hole. The valve seat is adapted to be engageable with the valve head. The cylindrical connecting portion of the pipe connection adapter has an outer diameter substantially equal to the inner diameter of the through-hole. The support legs extend from the front end surface of the cylindrical connecting portion so as to contact with the inner peripheral surface of the through-hole.

That is, in the above-described arrangements, the hole that receives the cylindrical connecting portion of the pipe connection adapter has a substantially uniform inner diameter over its entire length.

In the conventional arrangement where the front end portion of the pipe connection adapter is arranged to serve as a valve support member, as disclosed in the above-mentioned Japanese Utility Model Application Post-Examination Publication No. Sho 57-40399, the inner diameter of the hole for receiving the adapter cannot be made uniform over its entire length. Specifically, the inner diameter has to be enlarged in order to ensure proper provision of a fluid passage around the front end portion of the pipe connection adapter. Consequently, the structure becomes complicated. The above-described arrangement of the present invention solves this problem associated with the related art.

It should be noted here that the number of support legs may be three or more.

The above and other objects, features and advantages of the present invention will become more apparent from the following description of the preferred embodiments thereof, taken in conjunction with the accompanying drawings.

DESCRIPTION OF PREFERRED EMBODIMENTS

Embodiments of the female and male couplers of a pipe coupling according to the present invention will be described below with reference to the accompanying drawings.

Figure 1:
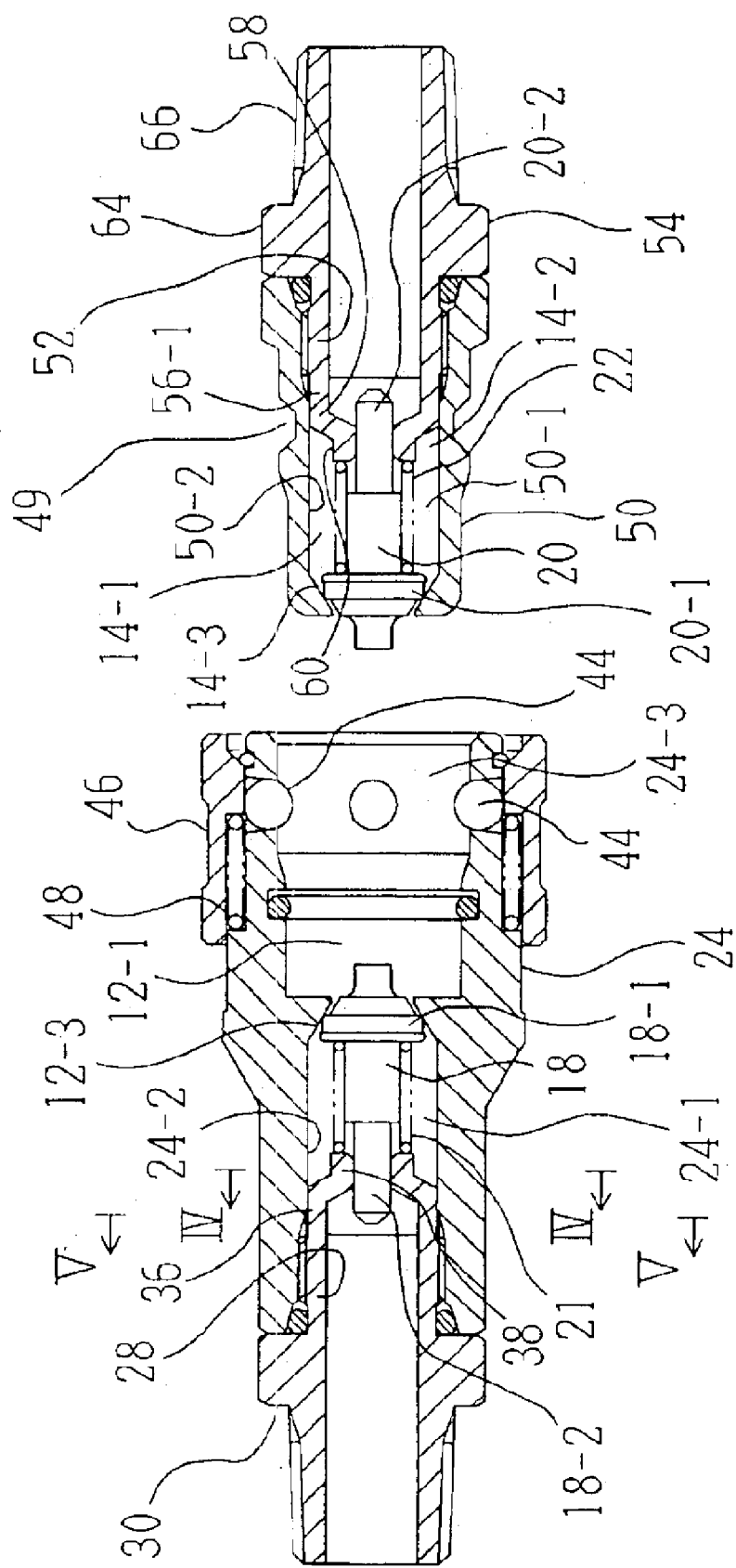
FIG. 1 is a sectional side view showing a female coupler and a male coupler of a pipe coupling according to the present invention in a state where the female coupler and the male coupler are separate from one another.

FIG. 1 shows a female coupler 12 and a male coupler 14 of a pipe coupling 10 according to the present invention.

Figure 2:
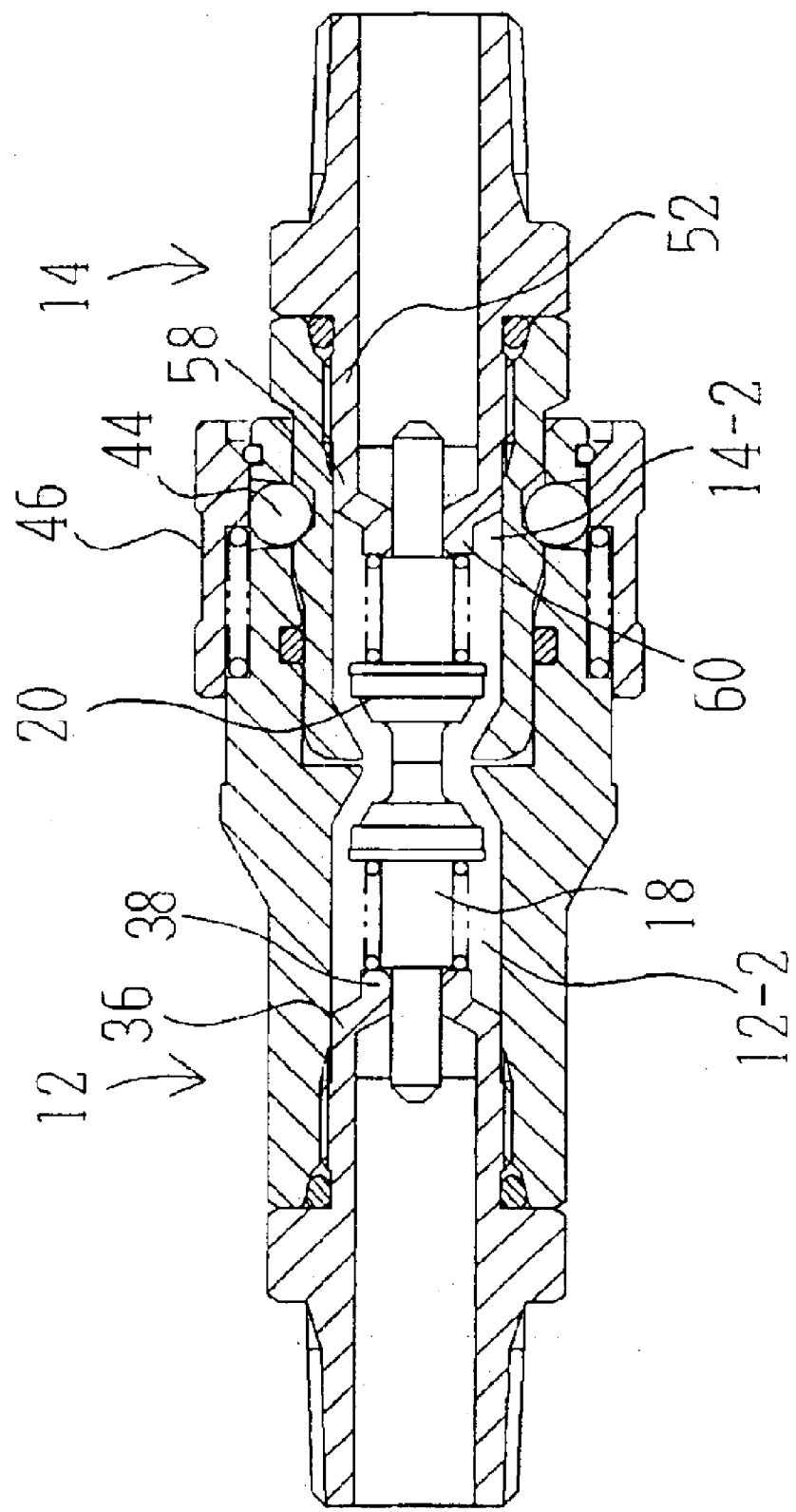
FIG. 2 is a sectional side view showing the female coupler and the male coupler in FIG. 1 in a state where they are connected to one another.

The female coupler 12 and the male coupler 14 have valve elements 18 and 20 provided in respective fluid passages 12-1 and 14-1. The valve elements 18 and 20 are urged by compression springs 21 and 22, respectively. When the female coupler 12 and the male coupler 14 are separate from one another, as shown in FIG. 1, the valve elements 18 and 20 are in engagement with annular valve seats 12-3 and 14-3 formed in the fluid passages 12-1 and 14-1 of the female coupler 12 and the male coupler 14, thereby closing the respective fluid passages 12-1 and 14-1. When the male coupler 14 is inserted into the female coupler 12 and is thus connected thereto, the distal ends of the valve elements 18 and 20 engage with one another, causing the valve elements 18 and 20 to retract and separate from the valve seats 12-3 and 14-3, thus opening the respective fluid passages 12-1 and 14-1 (see FIG. 2).

The female coupler 12 has a cylindrical female coupler body 24 adapted to receive the male coupler 14. The female coupler 12 further has a pipe connection adapter 30 with a cylindrical connecting portion 28 that is inserted into the female coupler body 24 from an opening at the rear end of the female coupler body 24 and is thus connected thereto in coaxial alignment.

The female coupler body 24 has an adapter receiving portion 24-1 that extends from the rear end of the female coupler body 24 towards the front end thereof to receive the cylindrical connecting portion 28 of the pipe connection adapter 30 and the valve element 18. The adapter receiving portion 24-1 has a substantially uniform inner diameter over its entire length. The female coupler body 24 further has a male coupler receiving portion 24-3 that communicates with the adapter receiving portion 24-1 through the annular valve seat 12-3 and extends as far as the front end of the female coupler 12.

Figure 3:
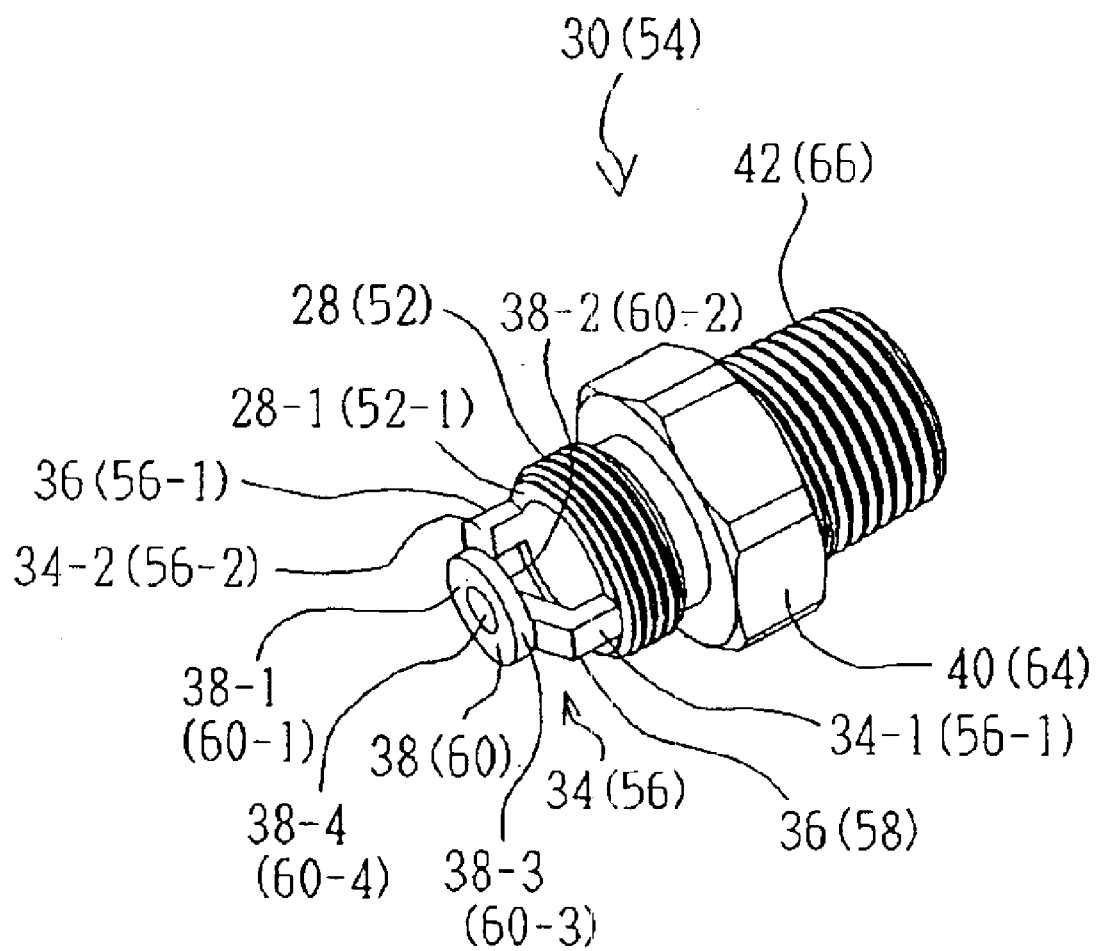
FIG. 3 is a perspective view of a pipe connection adapter.

FIG. 3 is a perspective view of the pipe connection adapter 30. As shown in the figure, the cylindrical connecting portion 28 (that is inserted into the adapter receiving portion 24-1 of the female coupler body 24) is formed with an external thread. The external thread is engaged with an internal thread formed on the adapter receiving portion 24-1. Two valve support members 34 are provided on the distal end of the cylindrical connecting portion 28. Each valve support member 34 has a support leg 36 that has an axial portion 34-1 extending from a distal end surface 28-1 of the cylindrical connecting portion 28, so as to contact the inner peripheral surface 24-2 of the adapter receiving portion 24-1. The support leg 36 further has a radial portion 34-2 extending forward from the distal end of the axial portion 34-I while slanting radially inward. The support legs 36 support a valve support ring 38. The valve support ring 38 has a front end surface 38-1, a rear end surface 38-2, an outer circumferential surface 38-3, and an inner circumferential surface 384. The front end surface 38-1 faces a valve head 18-1 of the valve element 18 set at a position axially forward of the valve support ring 38. The rear end surface 38-2 faces axially rearward of the valve support ring 38. The outer circumferential surface 38-3 has a diameter smaller than the outer diameter of the cylindrical connecting portion 28, whereby a fluid passage 12-2 is defined between the outer circumferential surface 38-3 and the inner peripheral surface 24-2 of the adapter receiving portion 24-1. The inner circumferential surface 38-4 slidably receives a valve guide rod 18-2 extending from the valve head 18-1 axially rearward of the cylindrical connecting portion 28. As illustrated in the figure, the pipe connection adapter 30 has a hexagonal portion 40 that is gripped with a tool when the pipe connection adapter 30 is threaded into the adapter receiving portion 24-1. The pipe connection adapter 30 further has an external thread 42 formed on the outer peripheral surface thereof to connect a pipe by thread engagement.

The female coupler body 24 has lock balls 44 displaceably provided in respective radial holes formed radially through the female coupler body 24 near the front end thereof. The female coupler body 24 further has a sleeve 46 axially displaceably provided around a front end portion of the female coupler body 24. When the male coupler 14 is to be inserted into the female coupler 12, the sleeve 46 is slid rearwards (leftwards in FIG. 1) against a compression spring 48, thereby allowing the lock balls 44 to be displaced radially outward. Under this condition, the male coupler 14 is inserted into the female coupler 12. Upon completion of insertion, the sleeve 46 is returned to the previous position, thereby securing the lock balls 44 in a ball receiving groove 49 on the male coupler 14, and thus securing the male coupler 14 in the female coupler 12 (see FIG. 2).

The male coupler 14 has a cylindrical male coupler body 50 that is received into the female coupler 12. The male coupler 14 further has a pipe connection adapter 54 with a cylindrical connecting portion 52 that is inserted into the male coupler body 50 from an opening at the rear end of the male coupler body 50, and is thus connected thereto in coaxial alignment with it.

The male coupler body 50 has a bore 50-1 extending there through from the rear end to the front end thereof. The bore 50-1 has an inner diameter approximately equal to the outer diameter of the pipe connection adapter 54. The valve seat 14-3 is formed on a distal end portion of the bore 50-1. The valve seat 14-3 is slanted radially inward towards the front end of the male coupler body 50 so that a valve head 20-1 of the valve element 20 can rest on the valve seat 14-3.

The pipe connection adapter 54 has an arrangement similar to that of the pipe connection adapter 30 of the female coupler 12 (see FIG. 3). That is, the cylindrical connecting portion 52 is formed with an external thread. The external thread is engaged with an internal thread formed on the inner peripheral surface 50-2 of the bore 50-1 of the male coupler body 50. Two valve support members 56 are provided on the distal end of the cylindrical connecting portion 52. Each valve support member 56 has a support leg 58 that has an axial portion 56-1 extending from a distal end surface 52-1 of the cylindrical connecting portion 52 so as to contact with the inner peripheral surface 50-2 of the bore 50-1 of the male coupler body 50. The support leg 58 further has a radial portion 56-2 extending forward from the distal end of the axial portion 56-1 while slanting radially inward. The support legs 58 support a valve support ring 60. The valve support ring 60 has a front end surface 60-1, a rear end surface 60-2, an outer circumferential surface 60-3, and an inner circumferential surface 604. The front end surface 60I faces the valve head 20-1 of the valve element 20 set at a position axially forward of the valve support ring 60. The rear end surface 60-2 faces axially rearward of the valve support ring 60. The outer circumferential surface 60-3 has a diameter smaller than the outer diameter of the cylindrical connecting portion 52, whereby a fluid passage 14-2 is defined between the outer circumferential surface 60-3 and the inner peripheral surface 50-2 of the bore 50-1 of the plug body 50. The inner circumferential surface 60-4 slidably receives a valve guide rod 20-2 extending from the valve head 20-1 axially rearward of the cylindrical connecting portion 52. The pipe connection adapter 54 has a hexagonal portion 64 that is gripped with a tool when the pipe connection adapter 54 is threaded into the bore 50-1 of the male coupler body 50. The pipe connection adapter 54 further has an external thread 66 formed on the outer peripheral surface thereof to connect a pipe (or a tube, etc.) by thread engagement.

Figure 4:
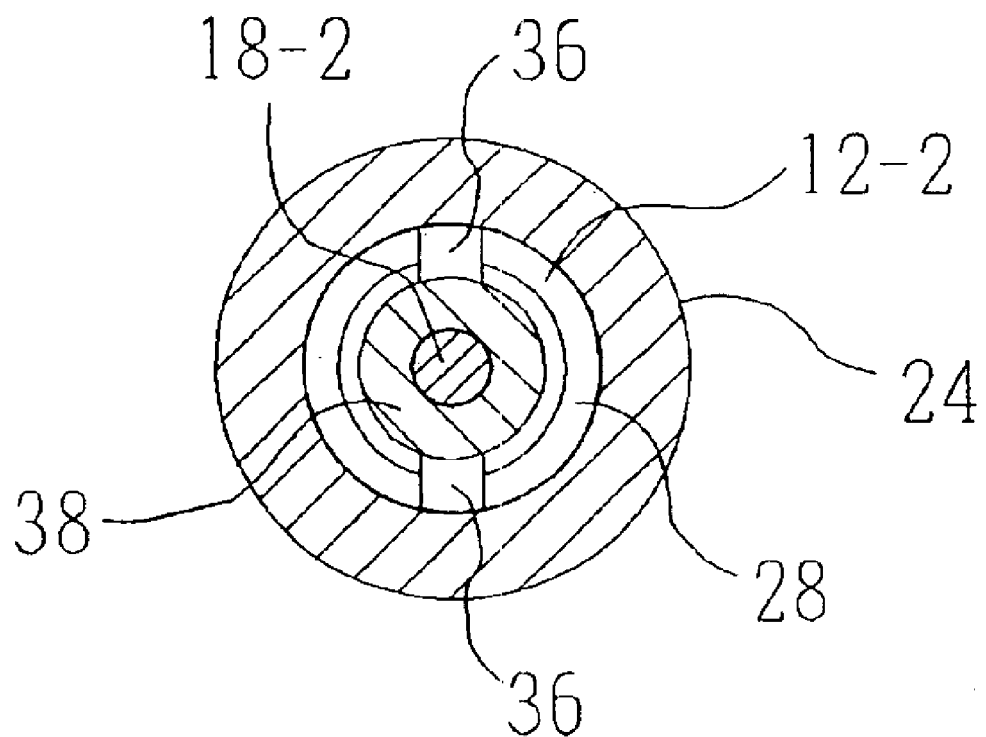
FIG. 4 is a sectional view taken along the line IV—IV in FIG. 1.
Figure 5:
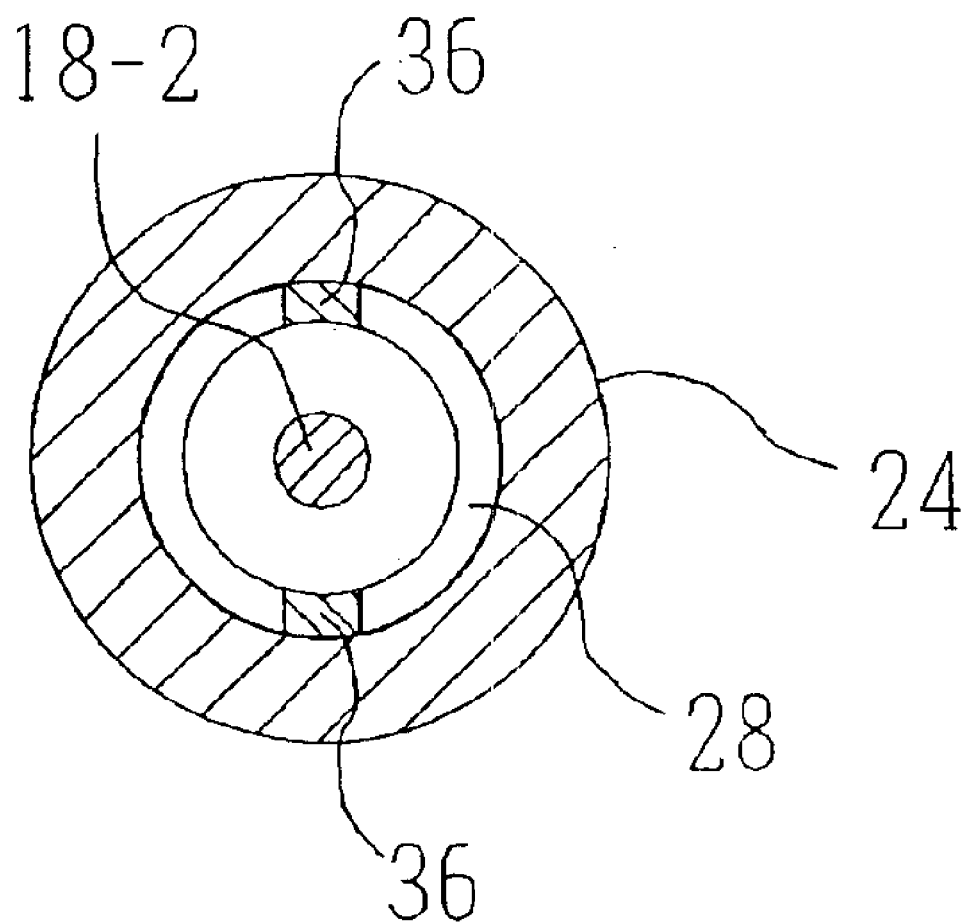
FIG. 5 is a sectional view taken along the line V—V in FIG. 1.

FIG. 4 is a sectional view taken along the line IV—IV in FIG. 1. FIG. 5 is a sectional view taken along the line V—V in FIG. 1. As will be understood from these figures, the valve support members 34 in the pipe coupling according to the present invention are arranged as stated above. Therefore, a sufficiently large passage cross-sectional area can be ensured around the valve support ring 38 without enlarging the diameter of the adapter receiving portion 24-1 of the female coupler body 24 at a position around the valve support ring 38. It is also possible to ensure a sufficiently large passage cross-sectional area at a portion where the support legs 36 are provided.

It should be noted that the present invention is not necessarily limited to the foregoing embodiments but can be modified in a variety of ways without departing from the gist of the present invention.

It is therefore intended that the foregoing detailed description be regarded as illustrative rather than limiting, and that it be understood that it is the following claims, including all equivalents, that are intended to define the spirit and scope of this invention.

What is claimed is:

1. A female coupler for connection to a male coupler to form a pipe coupling, said female coupler comprising:
    a cylindrical female coupler body having a front end opening, a rear end opening, and a through-hole extending between said front end opening and said rear end opening, said female coupler body being adapted to receive said male coupler from said front end opening for connection of said male coupler thereto;
    a pipe connection adapter having a cylindrical connecting portion that is inserted into said female coupler body from said rear end opening and is thus connected to said female coupler body; and
    a valve element set in said through-hole of said female coupler body at a position forward of said cylindrical connecting portion to enable said through-hole to be opened or closed;
    said pipe connection adapter having:
    a support leg extending from a front end surface of said cylindrical connecting portion axially forward of said cylindrical connecting portion; and
    a valve support ring secured to a front end of said support leg;
    said valve support ring having:
    a front end surface facing a valve head of said valve element set at a position axially forward of said valve support ring;
    a rear end surface facing axially rearward of said valve support ring;
    an outer circumferential surface having a diameter smaller than an outer diameter of said cylindrical connecting portion and defining a fluid passage between said circumferential surface and a wall surface of said through-hole of said female coupler body; and
    an inner circumferential surface slidably receiving a valve guide rod extending from said valve head axially rearward of said female coupler body;
    wherein said support leg is connected to said valve support ring at said rear end surface.

2. A female coupler according to claim 1, wherein said support leg has:
    an axial portion extending from said front end surface of said cylindrical connecting portion in parallel to a center axis of said cylindrical connecting portion; and
    a radial portion extending from a front end of said axial portion radially inward either at right angles or obliquely forward as far as said rear end surface of said valve support ring and secured to said rear end surface.

3. A female coupler according to claim 1, wherein there are provided two of said support legs that extend from respective positions on said front end surface of said cylindrical connecting portion that have a symmetrical relation relative to the center axis of said cylindrical connecting portion, said two support legs being secured to the rear end surface of said valve support ring at respective positions that have a symmetrical relation relative to the center axis of said cylindrical connecting portion.

4. A female coupler according to claim 2, wherein there are provided two of said support legs that extend from respective positions on said front end surface of said cylindrical connecting portion that have a symmetrical relation relative to the center axis of said cylindrical connecting portion, said two support legs being secured to the rear end surface of said valve support ring at respective positions that have a symmetrical relation relative to the center axis of said cylindrical connecting portion.

5. A female coupler according to claim 1, wherein said female coupler body has:
    an adapter receiving portion that extends from said rear end opening of said female coupler body toward a front end thereof to receive said cylindrical connecting portion of said pipe connection adapter and said valve head positioned forward of the front end of said cylindrical connecting portion, said adapter receiving portion having a uniform inner diameter over its entire length;
    an annular valve seat formed at a front end of said adapter receiving portion, said valve seat being adapted to be engaged with said valve head; and
    a male coupler receiving portion that communicates with said adapter receiving portion through said valve seat and extends as far as a front end of said cylindrical female coupler body;
    wherein said cylindrical connecting portion of said pipe connection adapter has an outer diameter equal to the inner diameter of said adapter receiving portion, and
    said support leg extends from said front end surface of said cylindrical connecting portion so as to contact with an inner peripheral surface of said adapter receiving portion.

6. A female coupler according to claim 2, wherein said female coupler body has:
    an adapter receiving portion that extends from said rear end opening of said female coupler body toward a front end thereof to receive said cylindrical connecting portion of said pipe connection adapter and said valve head positioned forward of the front end of said cylindrical connecting portion, said adapter receiving portion having a uniform inner diameter over its entire length;
    an annular valve seat formed at a front end of said adapter receiving portion, said valve seat being adapted to be engaged with said valve head; and
    a male coupler receiving portion that communicates with said adapter receiving portion through said valve seat and extends as far as a front end of said cylindrical female coupler body;
    wherein said cylindrical connecting portion of said pipe connection adapter has an outer diameter equal to the inner diameter of said adapter receiving portion, and
    said support leg extends from said front end surface of said cylindrical connecting portion so as to contact an inner peripheral surface of said adapter receiving portion.

7. A female coupler according to claim 3, wherein said female coupler body has:
    an adapter receiving portion that extends from the rear end opening of said female coupler body toward a front end thereof to receive said cylindrical connecting portion of said pipe connection adapter and said valve head positioned forward of the front end of said cylindrical connecting portion, said adapter receiving portion having a uniform inner diameter over its entire length;
    an annular valve seat formed at a front end of said adapter receiving portion, said valve seat being adapted to be engaged with said valve head; and
    a male coupler receiving portion that communicates with said adapter receiving portion through said valve seat and extends as far as a front end of said cylindrical female coupler body;

wherein said cylindrical connecting portion of said pipe connection adapter has an outer diameter equal to the inner diameter of said adapter receiving portion, and said support legs extend from the front end surface of said cylindrical connecting portion so as to contact with an inner peripheral surface of said adapter receiving portion.

8. A female coupler according to claim 4, wherein said female coupler body has:

an adapter receiving portion that extends from the rear end opening of said female coupler body toward a front end thereof to receive said cylindrical connecting portion of said pipe connection adapter and said valve head positioned forward of the front end of said cylindrical connecting portion, said adapter receiving portion having a uniform inner diameter over its entire length;

an annular valve seat formed at a front end of said adapter receiving portion, said valve seat being adapted to be engaged with said valve head; and a male coupler receiving port ion that communicates with said adapter receiving portion through said valve seat and extends as far as a front end of said cylindrical female coupler body;

wherein said cylindrical connecting portion of said pipe connection adapter has an outer diameter equal to the inner diameter of said adapter receiving portion, and said support legs extend from the front end surface of said cylindrical connecting portion so as to contact with an inner peripheral surface of said adapter receiving portion.

9. A male coupler for connection to a female coupler to form a pipe coupling, said male coupler comprising:

a cylindrical male coupler body having a front end opening, a rear end opening, and a through-hole extending between said front end opening and said rear end opening, said male coupler body being inserted into said female coupler to connect with said female coupler;

a pipe connection adapter having a cylindrical connecting portion that is inserted into said male coupler body from said rear end opening, and is thus connected to said male coupler body; and a valve element set in said through-hole of said male coupler body at a position forward of said cylindrical connecting portion to open or close said through-hole;

said pipe connection adapter having:

a support leg extending from a front end surface of said cylindrical connecting portion axially forward of said cylindrical connecting portion; and a valve support ring secured to a front end of said support leg;

said valve support ring having:

a front end surface facing a valve head of said valve element set at a position axially forward of said valve support ring;

a rear end surface facing axially rearward of said valve support ring;

an outer circumferential surface having a diameter smaller than an outer diameter of said cylindrical connecting portion and defining a fluid passage between said outer circumferential surface and a wall surface of said through-hole of said male coupler body; and an inner circumferential surface slidably receiving a valve guide rod extending from said valve head axially rearward of said male coupler body;

wherein said support leg is connected to said valve support ring at said rear end surface.

10. A male coupler according to claim 9, wherein said support leg has:

an axial portion extending from said front end surface of said cylindrical connecting portion in parallel to a center axis of said cylindrical connecting portion; and a radial portion extending from a front end of said axial portion radially inward either at right angles or obliquely forward as far as the rear end surface of said valve support ring and secured to said rear end surface.

11. A male coupler according to claim 9, wherein there are provided two of said support legs that extend from respective positions on said front end surface of said cylindrical connecting portion that have a symmetrical relation relative to the center axis of said cylindrical connecting portion, said two support legs being secured to the rear end surface of said valve support ring at respective positions that have a symmetrical relation relative to the center axis of said cylindrical connecting portion.

12. A male coupler according to claim 10, wherein there are provided two of said support legs that extend from respective positions on said front end surface of said cylindrical connecting portion that have a symmetrical relation relative to the center axis of said cylindrical connecting portion, said two support legs being secured to the rear end surface of said valve support ring at respective positions that have a symmetrical relation relative to the center axis of said cylindrical connecting portion.

13. A male coupler according to claim 9, wherein said through-hole of said male coupler body extends from the rear end opening of said male coupler body toward a front end thereof, and an annular valve seat is formed at a front end of said through-hole, said valve seat being adapted to be engaged with said valve head, wherein said cylindrical connecting portion of said pipe connection adapter has an outer diameter equal to an inner diameter of said through-hole, and said support leg extends from said front end surface of said cylindrical connecting portion so as to contact the inner peripheral surface of said through-hole.

14. A male coupler according to claim 10, wherein said through-hole of said male coupler body extends from the rear end opening of said male coupler body toward a front end thereof, and an annular valve seat is formed at a front end of said through-hole, said valve seat being adapted to be engaged with said valve head, wherein said cylindrical connecting portion of said pipe connection adapter has an outer diameter equal to an inner diameter of said through-hole, and said support leg extends from said front end surface of said cylindrical connecting portion so as to contact with the inner peripheral surface of said through-hole.

15. A male coupler according to claim 11, wherein said through-hole of said male coupler body extends from the rear end opening of said male coupler body toward a front end thereof, and an annular valve seat is formed at a front end of said through-hole, said valve seat being adapted to be engaged with said valve head, wherein said cylindrical connecting portion of said pipe connection adapter has an outer diameter equal to an inner diameter of said through-hole, and said support legs extend from said front end surface of said cylindrical connecting portion so as to contact with the inner peripheral surface of said through-hole.

16. A male coupler according to claim 12, wherein said through-hole of said male coupler body extends from the rear end opening of said male coupler body toward a front end thereof, and an annular valve seat is formed at a front end of said through-hole, said valve seat being adapted to be engaged with said valve head, wherein said cylindrical connecting portion of said pipe connection adapter has an outer diameter equal to an inner diameter of said through-hole, and said support legs extend from said front end surface of said cylindrical connecting portion so as to contact with the inner peripheral surface of said through-hole.

* * * * *